(12) United States Patent
Eriksson et al.

(10) Patent No.: US 7,150,475 B2
(45) Date of Patent: Dec. 19, 2006

(54) SHEAR-RESISTANT MODULAR FLUIDIC BLOCKS

(75) Inventors: Mark L. Eriksson, St. Cloud, MN (US); Jeffry R. Markulec, St. Joseph, MN (US); Dennis G. Rex, Sunnyvale, CA (US)

(73) Assignee: Talon Innovations, Inc., Sauk Rapids, MN (US)

( * ) Notice: Subject to any disclaimer, the term of this patent is extended or adjusted under 35 U.S.C. 154(b) by 413 days.

(21) Appl. No.: 10/196,733

(22) Filed: Jul. 15, 2002

(65) Prior Publication Data

US 2003/0075920 A1 Apr. 24, 2003

Related U.S. Application Data

(60) Provisional application No. 60/305,235, filed on Jul. 13, 2001.

(51) Int. Cl.
*F16L 39/00* (2006.01)

(52) U.S. Cl. ............... 285/124.5; 285/212; 137/271

(58) Field of Classification Search .............. 285/18, 285/211, 189, 202, 203, 204, 208, 212, 125.1, 285/124.5; 137/271
See application file for complete search history.

(56) References Cited

U.S. PATENT DOCUMENTS

| | | | | |
|---|---|---|---|---|
| 3,219,053 | A | * | 11/1965 | Hupp ........................ 137/271 |
| 3,589,387 | A | * | 6/1971 | Raymond ................... 137/271 |
| 3,654,960 | A | * | 4/1972 | Kiernan ..................... 137/884 |
| 3,680,589 | A | * | 8/1972 | Jeans et al. ................ 137/271 |
| 3,785,389 | A | | 1/1974 | Friedland et al. |
| 3,915,194 | A | * | 10/1975 | Friedrich ................... 137/271 |
| 4,062,569 | A | * | 12/1977 | Kay ............................. 285/4 |
| 5,178,191 | A | | 1/1993 | Schaefer |
| 5,433,454 | A | | 7/1995 | Ramberg |
| 5,445,393 | A | | 8/1995 | Ramberg |
| 5,836,355 | A | | 11/1998 | Markulec et al. |
| 5,860,676 | A | * | 1/1999 | Brzezicki et al. ............ 285/24 |
| 5,964,481 | A | * | 10/1999 | Buch ........................... 285/18 |
| 5,988,203 | A | * | 11/1999 | Hutton ....................... 137/271 |
| 6,102,074 | A | * | 8/2000 | Bouteille ................... 137/271 |
| 6,158,454 | A | | 12/2000 | Duret et al. |
| 6,192,938 | B1 | * | 2/2001 | Redemann et al. ......... 137/271 |
| 6,231,260 | B1 | | 5/2001 | Markulec et al. |
| 6,302,141 | B1 | | 10/2001 | Markulec et al. |

FOREIGN PATENT DOCUMENTS

WO    WO 98/25058    6/1998

OTHER PUBLICATIONS

Talon Modular Gas System Components, TA1-18 Parts, 2 pages.
Talon, TA2 Standard Parts Library Basic Blocks, Manifolds, IO and Bridge Blocks, TA2 Parts.

* cited by examiner

*Primary Examiner*—David Bochna
(74) *Attorney, Agent, or Firm*—McDonnell Boehnen Hulbert & Berghoff LLP

(57) ABSTRACT

A block for a modular fluid block assembly is disclosed. The block includes first and second opposed faces and first and second apertures from the first face to the second face for receiving a fastener. Each aperture includes a first end and a second end and a head receiving cavity disposed adjacent the first end. The block further includes a fluidic passage passing from the first face to the second face and a pair of fastener receiver cavities in the first face. The block further includes a pair of head receiving cavities in the second face.

8 Claims, 7 Drawing Sheets

SHEAR-RESISTANT MODULAR FLUIDIC BLOCKS

PRIORITY

The application claims priority to provisional patent application 60/305,235, filed Jul. 13, 2001, entitled Shear Resistant Modular Fluidic Blocks and also to patent application Ser. No. 10/194,045, filed Jul. 12, 2002, entitled Shear Resistance Modular Fluidic Blocks.

FIELD OF THE INVENTION

The present invention relates to the field of fluid handling devices generally, and particularly to an apparatus and method for joining modular fluid handling blocks used in the semiconductor industry.

BACKGROUND OF THE INVENTION

The advent and usefulness of modular architectures for semiconductor fabrication fluids are disclosed in U.S. Pat. No. 5,836,355 issued to Markulec et. al. on Nov. 17, 1998, in U.S. Pat. No. 5,964,481 issued to Buch on Oct. 12, 1999, and in U.S. Pat. No. 6,085,783 issued to Hollingshead on Jul. 11, 2000. These various architectures, or modular building blocks, for fluid delivery afford ease of fluid system design, ease of assembly, reduced size, improved serviceability, and reduced wetted surface area when compared to conventional tubulated-and-welded fluid delivery systems.

The modular blocks, sometimes referred to as substrates, disclosed in the patents cited above, share some common features, among which are the planar block interfaces which, when compressed one against another with an interdisposed seal, form a contiguous and hermetic path for fluid delivery. Compression of multiple blocks may be effected several ways. One way is to use "long" bolts cut to the length specific to a particular multi-block assembly and which, when inserted through accommodating holes in the plurality of blocks and fasteners thereon tightened, compress all the blocks, block interfaces, and inter-block seals simultaneously. Another way is to bolt, in turn, one block or substrate to another in a sequential and iterative fashion with "short" bolts to accomplish the desired multi-block assembly.

When assembled into fluid delivery panels and completed by the attachment of functional control elements such as valves, regulators, pressure transducers and the like, these modular fluid delivery systems are currently used in virtually all types of semiconductor fabrication processes. By their very nature, these processes often employ fluids that are extremely toxic and/or volatile. Further, introduction of contamination, such as air, to various of these fluids, or escape of these fluids to air, may result in failure of the process and loss of product, downtime of the process, or worse, severe injury or fatality to operating personnel. Specifically, it is imperative that the hermeticity, or seal integrity, of the compressed-and-sealed interfaces of all the blocks comprising the fluidic delivery system remain uncompromised throughout delivery, installation, and operational lifetime of the system, making the mechanical and leak integrity of bolted-together modular fluid-delivery systems is of the highest priority.

Current practice for sealing modular fluid-delivery blocks one to another, wherein seals are required, calls for the use of compressible toroidal metal gaskets often referred to as C-seals. This type of seal has been specified by Semiconductor Equipment and Materials International (SEMI) draft document 2787.1 as the standard seal for use in sealing components, such as valves, regulators, filters, etc. to modular fluid-delivery blocks in the semiconductor industry, and as such has become the de facto standard for inter-block seals as well. Examples of these seals may be seen in U.S. Pat. No. 4,603,892 issued to Abbes on Aug. 5, 1986 and U.S. Pat. No. 4,218,067 issued to Halling on Aug. 19, 1980. In general, these seals have been designed to be compressed between opposing metal surfaces to form a hermetic seal between them. The seals themselves are designed to have inherent elastic deformation sufficient to maintain conformation to said opposing metal surfaces, when compressed to prescribed limits between opposing and appropriately-finished metal surfaces, with sufficient resilient force to create a hermetic seal.

The primary force that resists shear between any two compressed and C-sealed modular fluid-delivery blocks is simply the arithmetic product of the compressive force and the coefficient of friction of the inter-block surfaces. Because the C-seal itself is designed to be a compliant and compressible sealing element between the blocks, its frictional coefficient-compression product provides negligible shear resistance to the overall assembly. Because of size and weight constraints in modern semiconductor fabrication equipment and facilities, the semiconductor industry has placed considerable emphasis upon size-reduction of modular fluid-delivery systems. A significant requirement of such size reduction is the necessity to use smaller bolts for the assembly, and therefore the seal compression, of smaller modular blocks. As a consequence of smaller bolts, available compressive forces are reduced because of reduced bolt torque capability, with a corresponding reduction of force to resist block-to-block shear stress during shipment, installation, and operation of the modular fluid delivery systems.

All fluid delivery systems, including modular block architectures, for semiconductor processing applications must pass rigorous shock and vibration qualification, as put forth in SEMI document #3091, as well as meet practical objectives for robustness as presented earlier. What is needed, then, is a practical, cost-effective method to provide mechanical robustness, particularly shear resistance, between modular blocks of increasingly small sizes compressed with increasingly smaller bolts.

SUMMARY OF THE INVENTION

One embodiment of the present invention is directed to a modular fluid-delivery block system in which the modular blocks are bolted one to the next and in which partially-protruding bolt heads from one block engage recessed counterbores in the next block to provide shear resistance. The diameters of the counterbores are sufficiently small such that the bolt heads cannot shift laterally by more than a predetermined amount; the predetermined amount is less than the amount of shift that is likely to result in a leakage in the system.

Another embodiment of the present invention is directed to a block for a modular fluid block assembly. The block includes first and second opposed faces and first and second apertures from the first face to the second face for receiving a fastener. Each aperture includes a first end and a second end and a head receiving cavity disposed adjacent the first end. The block further includes a fluidic passage passing from the first face to the second face and a pair of fastener receiver cavities in the first face. The block further includes a pair of head receiving cavities in the second face.

DETAILED DESCRIPTION

Figure 7:
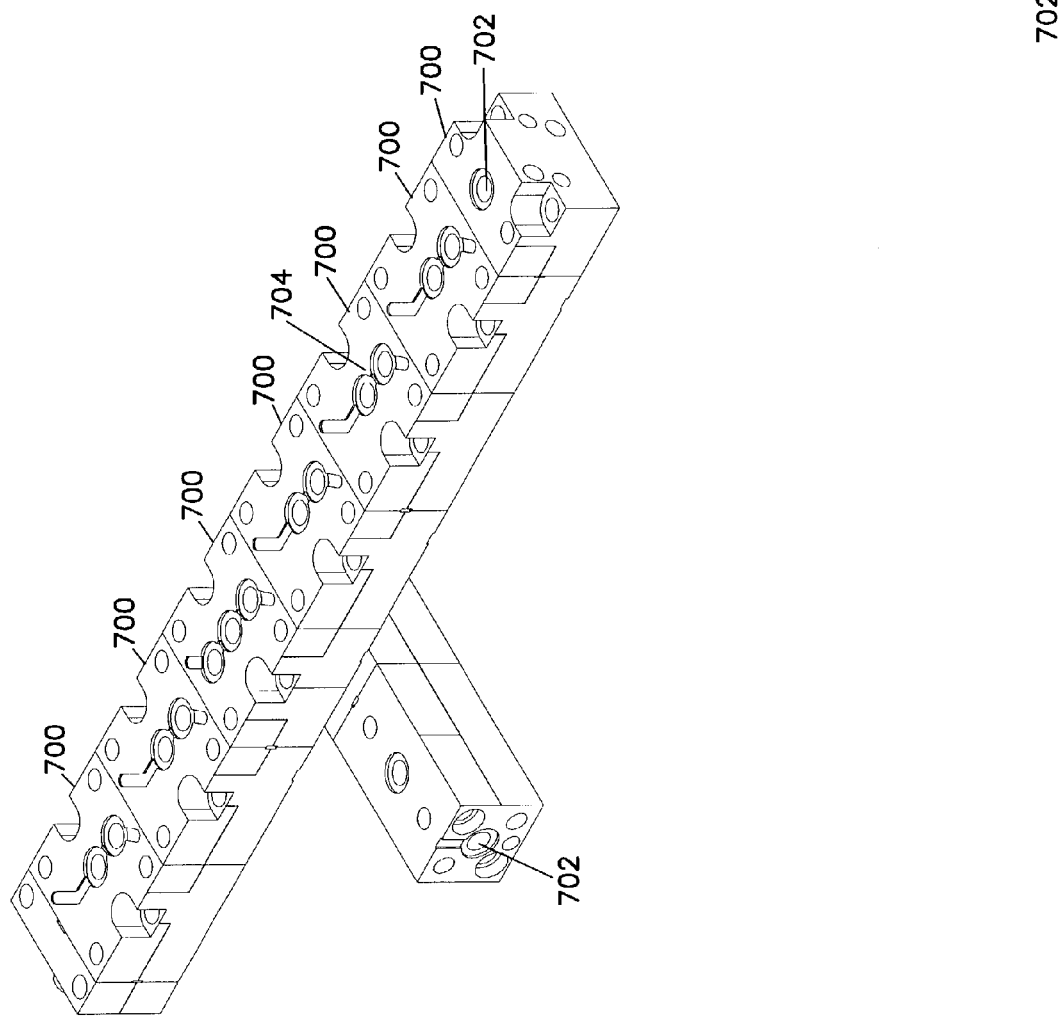
FIG. 7 is a perspective view of an example embodiment of a modular fluid-delivery assembly of the present invention.

The embodiments described in this application are particularly useful with all modular fluidic assemblies that incorporate metal seals compressed between planar modular block surfaces for the purpose of effecting hermetic fluid paths therebetween. Referring to FIG. 7, shown is the general environment in which a plurality of modular blocks 700 are attached to form separate linear assemblies and gas paths 702. Various fluid measuring or flow-control devices can be attached to the modular blocks to suit the system needs. For example, a pressure transducer can be attached to a pressure transducer interface 704 to provide a signal indicative of the pressure of the fluid.

Semiconductor manufacturing industry convention has placed significant emphasis upon reduction in size and weight of modular fluid-delivery systems. The resulting size of the modular blocks now used for such systems requires increasingly smaller fasteners for the attachment of one block to another, and compression of the metal gasket between them.

Fasteners in fluidic block systems are limited by spatial constraints and preferably two 4 mm, or M4, bolts or screws are used for attachment of one modular block to an adjacent block. Because of the potentially corrosive environments in which the fluid delivery assemblies must function, preferably stainless steel, or similarly corrosion-resistant alloys are used. Thus both the size and alloy selections for the fasteners place practical limits on the fastener torque, and therefore the compressive force available for the assembly of one modular block to the next. Preferably, the torque limit on M4 and similarly-sized socket head cap screws is limited by convention and hex wrench strip-out to 40 inch-pounds.

Figure 1:
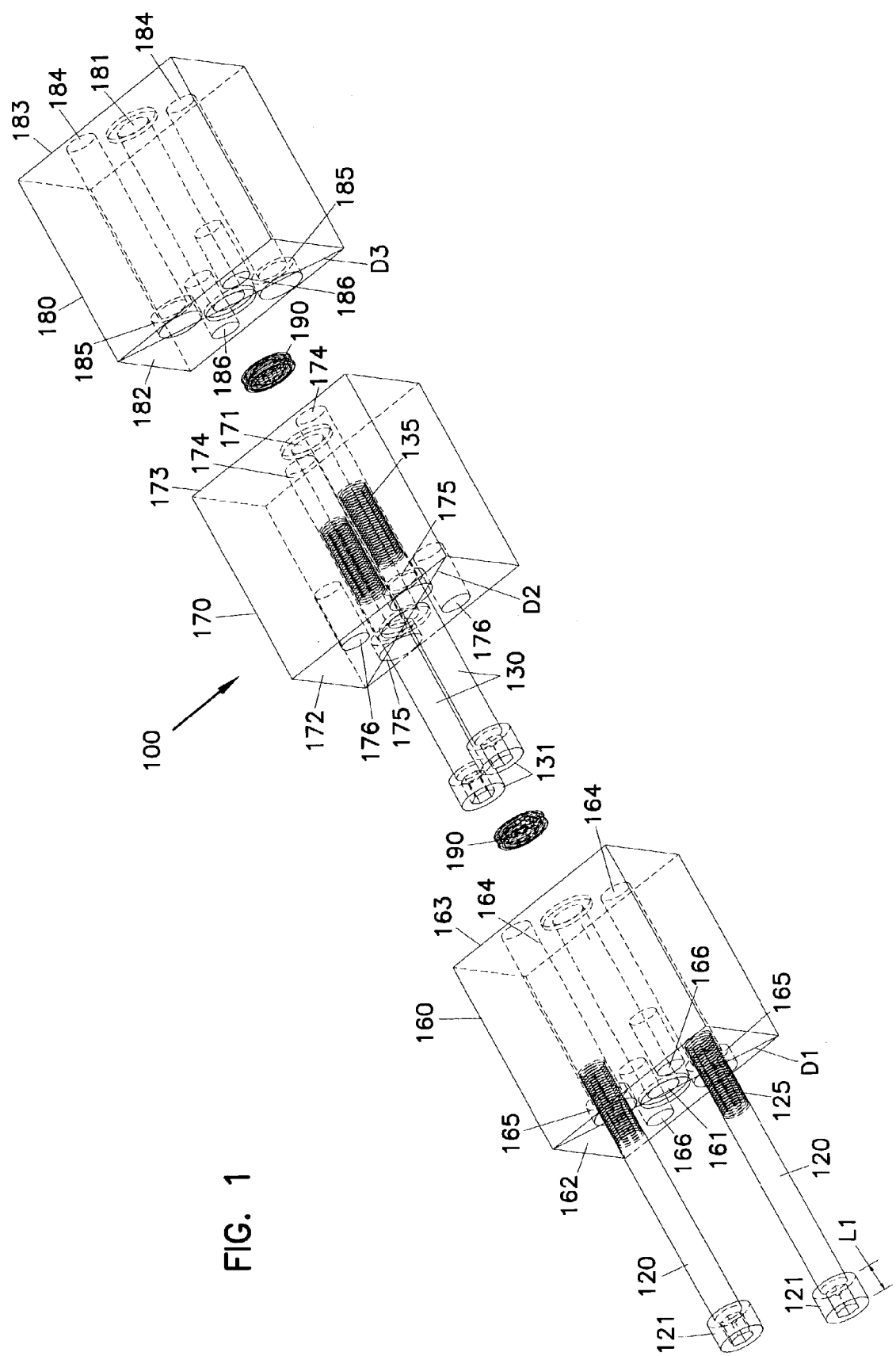
FIG. 1 is an exploded perspective view of an example embodiment of a modular fluidic block assembly of the present invention.
Figure 2:
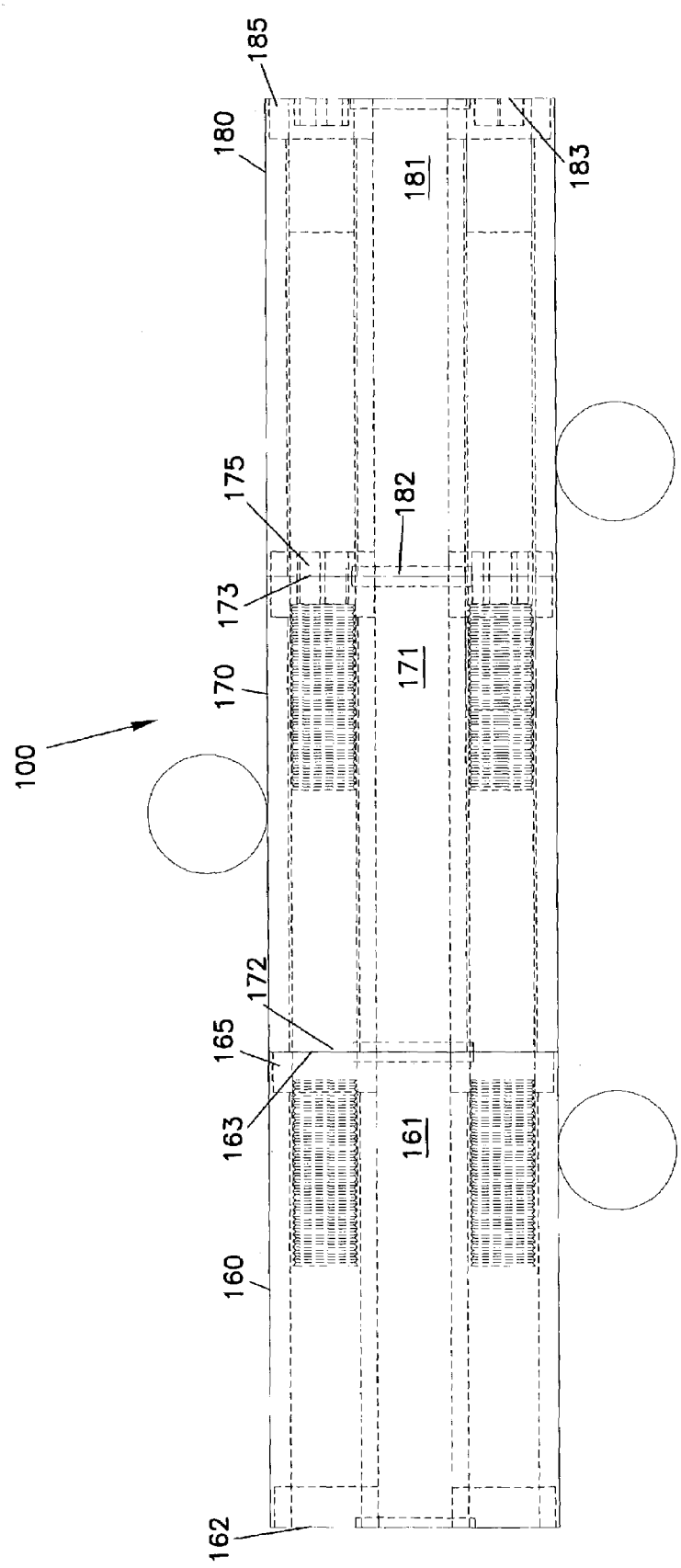
FIG. 2 is a side view of the 3-block fluidic assembly of FIG. 1 showing a 3-point shear testing setup.

Referring to FIGS. 1 and 2, shown is an exploded assembly 100 of three fluidic blocks including first, second and third blocks 160, 170, 180 incorporating an example embodiment of the present invention. Each block 160, 170, 180 includes a respective fluid passage 161, 171, 181, and a first face 162, 172, 182 and a second face 163, 173, 183. Each block 160, 170, 180 further includes at last two thread receiving cavities 166, 176, 186 for receiving and securing a threaded portion of a fastener, preferably a screw or bolt and each block 160, 170, 180 also includes at least two fastener apertures 164, 174, 184 for allowing a fastener 120, 130, 140 to be inserted therethrough for securing to the adjacent block.

The fastener arrangement 150 is such that the fastener 120, 130, 140 orientation is staggered or alternated between successive adjacent blocks. For example, the fastener apertures 164 in the first block 160 are oriented in a first diagonal line D1 across the first face 163 of the first block 160, with the centers of the apertures 164 and the center of the fluid passage 161 being collinear. The apertures 174 on the second block 170 are arranged along a second diagonal line D2 on the first face 173 of the second block 170, with the centers of the apertures 173 and fluid passage 171 being collinear. The first and second diagonal lines D1, D2 are perpendicular. Similarly, there is a third diagonal line D3 across the first face 182 of the third block 180 that is parallel to the first diagonal line D1 on the first block 160. For arrangements with more than three blocks, each block has a fastener arrangement that is oriented perpendicular to the fastener arrangement of its neighboring blocks.

Referring back to FIG. 1, each fastener aperture 164, 174, 184 includes a head receiving portion 165, 175, 185 adjacent the first face 162, 172, 182 that is preferably formed by counter-boring to a depth to completely accept the full length L1 of the heads 121, 131, 141 of the fastener 120, 130, 140 inserted into it. After inserting a fastener 120, 130, 140 into its corresponding fastener aperture 164, 174, 184, each fastener 120, 130, 140 is secured into its corresponding fastener receiving cavity 166, 176, 186 in the adjacent block. Referring to FIG. 2, the threaded portion 125, 135, 145 of the fastener 120, 130, 140 extends completely through and beyond the block 160, 170, 180 in which they are inserted for the purpose of engaging similarly disposed threaded holes in the adjacent block, thus joining adjacent blocks and sealing the fluid passages.

Figure 3:
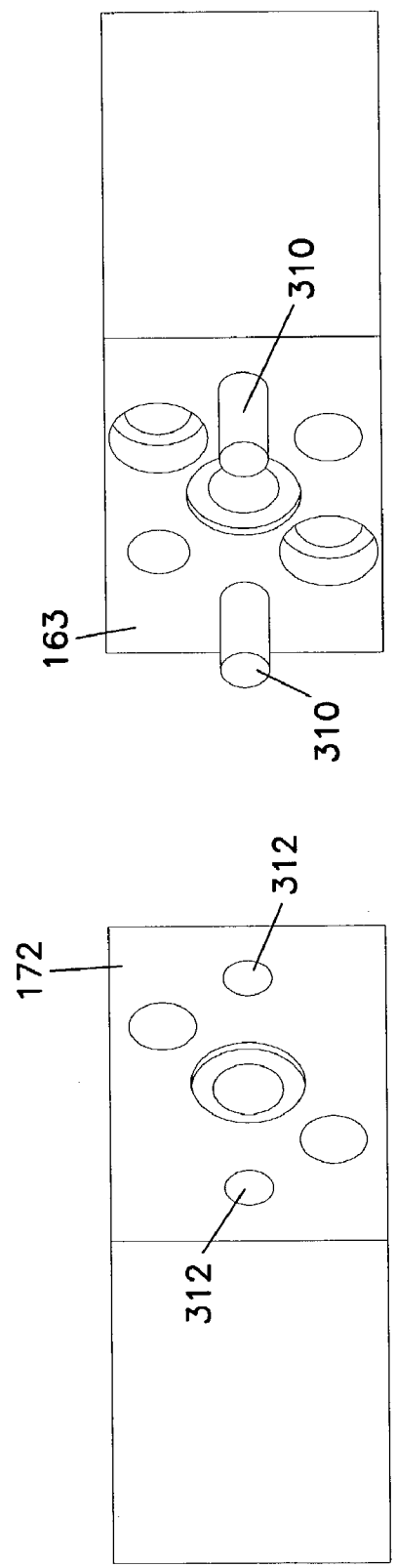
FIG. 3 is a perspective view of another example embodiment of a shear resistant modular fluidic block assembly of the present invention.

The arrangement shown in FIG. 1 may be modified to include locating devices to ease assembly of adjacent blocks. One such modification is to add locator dowels or pins 310 as shown in FIG. 3. Referring to FIG. 3, shown is an example of this arrangement, in which precision pins 310 are pressed into one block face 163, and corresponding receptive holes 312 are located into the mating face 172 of the adjacent block. Upon assembly, the pins 310 of one block register precisely 312 in the holes of its neighboring block.

Figure 4:
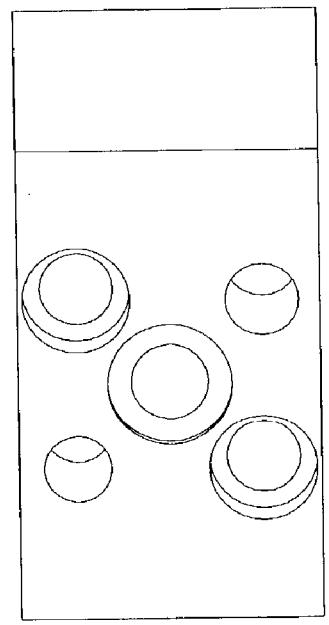
FIG. 4 is a perspective view of another example embodiment of a modular fluidic block assembly that of the present invention.
Figure 4:
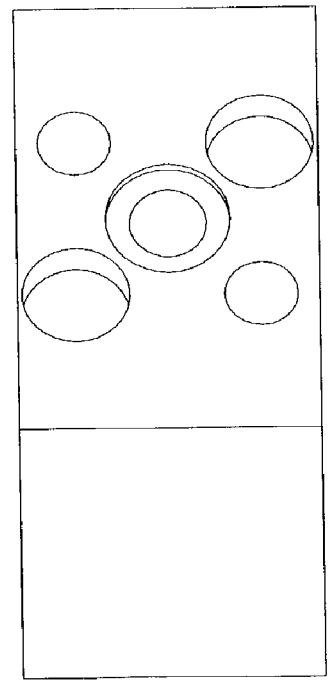
Figure 5:
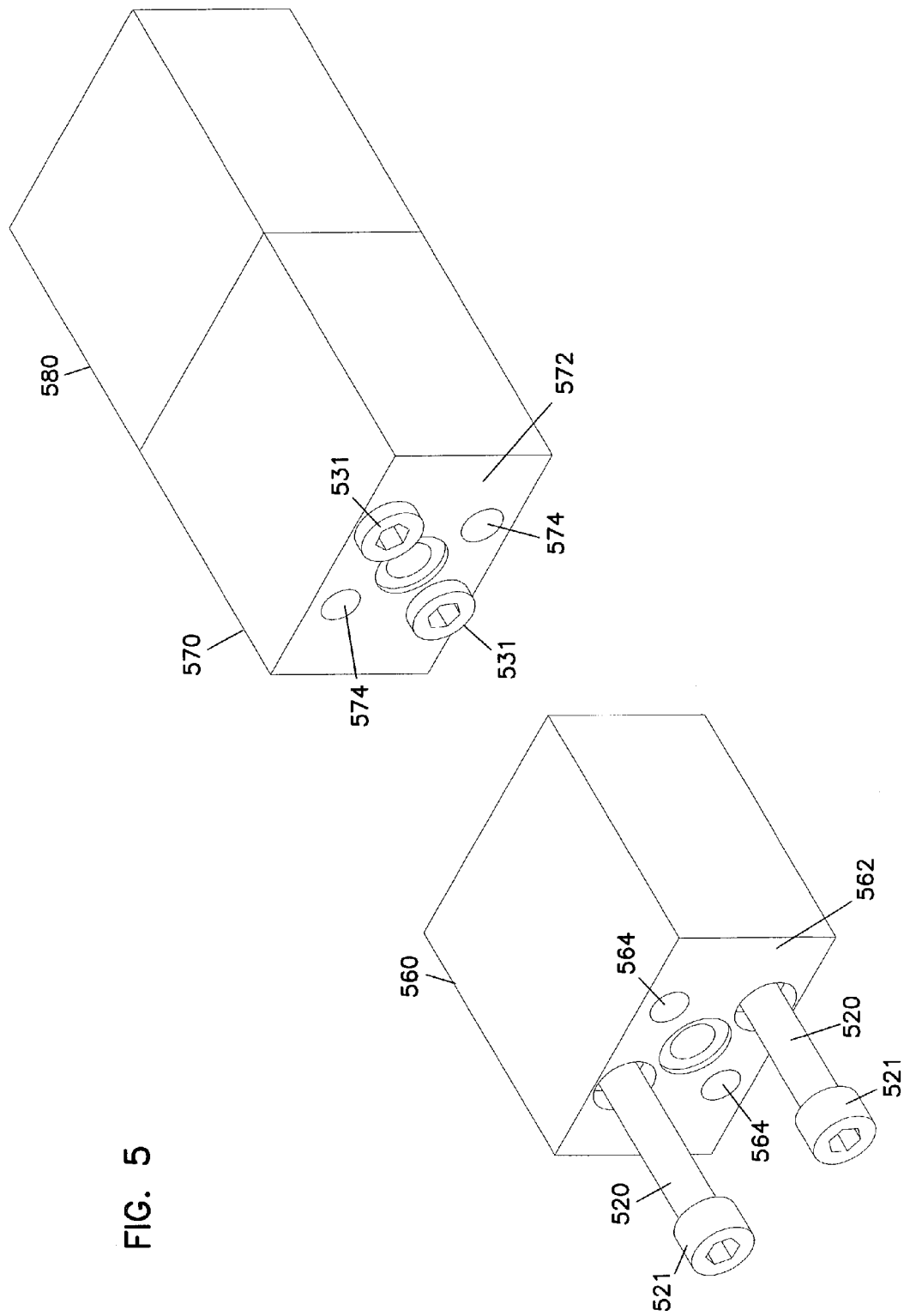
FIG. 5 is a perspective view an example embodiment of an assembly sequence of fluidic blocks of FIG. 4 of the present invention.
Figure 6:
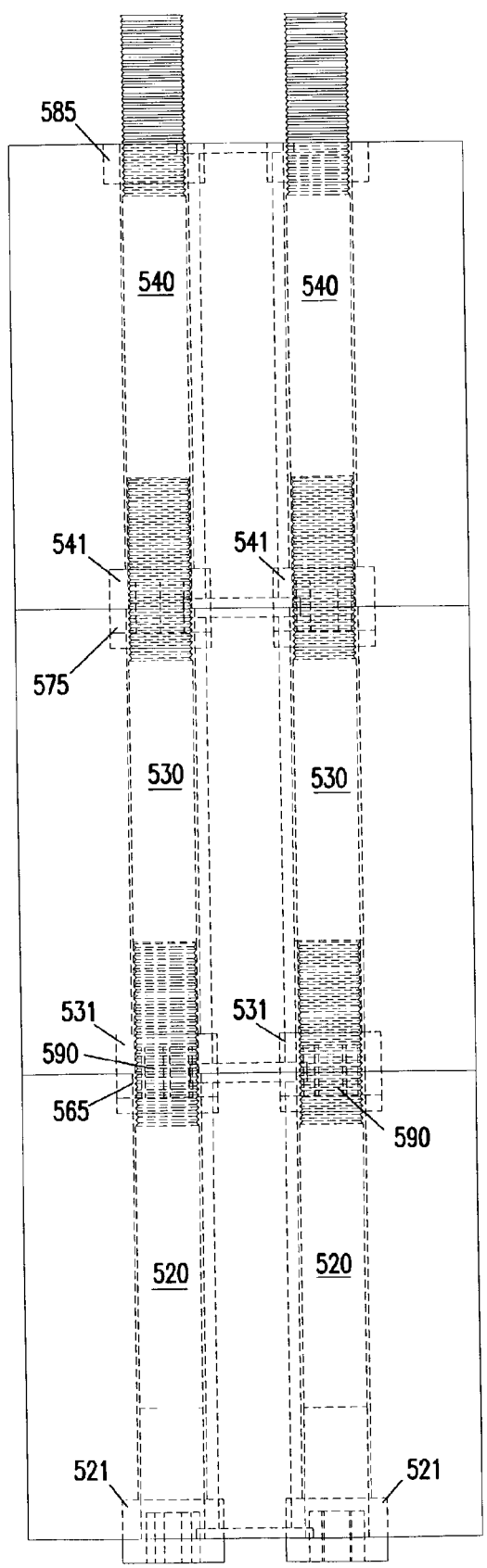
FIG. 6 is a plan view of an example embodiment the assembly of FIG. 5

Referring to FIGS. 5 and 6, shown is another example embodiment of the present invention. This embodiment is similar to the example embodiment shown in FIGS. 1 and 2, except the head receiving portion 565, 575, 585 are preferably counter-bored to accept only a portion of the entire length of the head 521, 531, 541 of the fastener 520, 530, 540. Preferably, head receiving portions 565, 575, 585 are machined to a depth of about half of the length of the head 521, 531, 541. Referring to FIG. 6, in this embodiment each fastener head 521, 531, 541 is received partially into head receiving portion 565, 575, 585 of adjacent blocks. For example, referring to FIGS. 5 and 6, when the fasteners 520, 530, 540 received into the fastener receiving apertures 564, 574, 584 are inserted into the first block 560 and secured into corresponding fastener receiving apertures 574 and tightened through the first block 560 against an adjacent second block 570 for the compression of the two block 560, 570 interfaces and seal 590, approximately one-half of the length of the head 521 remains extended or protruding from the face of the first block 560. The heads 521, 531, 541 fit in their respective head receiving portions 565, 575, 585 in close lateral tolerance, and a portion of the heads 521, 5314, 541 protrude above the first face 572 of the second block 570. Further, referring again to FIG. 4, the preferred embodiment includes the machining of receiving counterbores in the next block of the assembly. Thus it can be appreciated, as may be seen in FIG. 1 and in FIG. 5, that this embodiment employs a diagonally alternating pattern of bolts and receiving counterbores for each sequential modular block in an assembly.

Preferably, the sizes and tolerances for the cap screws linking the modular blocks and the counter-bores for receiving the caps of such screws are chosen such that the maximum lateral shift of a screw cap in the counter-bore where the cap is located does not lead to a leakage in the seal between the blocks on either side of the seal. One of skill in the art will recognize that the diameter of the counter-bores can be specified to be larger than the screw caps by an amount equal to the tolerance of the screw caps, and the total tolerance of the screw caps and counter-bores can be chosen to be required to be smaller than the amount of inter-block shift that would cause leakage. Commercial socket cap screws from many sources have been found to have a cap diameter tolerance of about 0.001 inches or less. Based on the commercial tolerances, the counter-bores for the screws can designed to be 0.001 inches wider than the screw caps and can be specified to have a tolerance of 0.001 inches. The total amount of inter-block shift can then be limited to 0.002 inches or less under standard testing conditions.

Tests by the inventors on the present invention have shown it to have increased shear resistance. Referring to FIG. 2. shown is an assembly of the three blocks, and a schematic representation of the 3-point shear test used to test the mechanical resistance of the assembly to shear stress. Two stationary supports, or anvils, are located just outboard of the center block to outboard block interfaces and measured force is applied to the middle of the center block until failure of either of the inter-block seals occurred. To detect seal failure, a helium mass spectrometer, or leak detector, is connected to the block assembly, and the assembly sprayed with helium, while force is applied. A surface plate and height gauge is employed to measure the initial and final offset of the center block bottom surface relative to both end blocks' bottom surfaces for the purpose of quantifying shear strain or dislocation resulting in seal failure. For the assembly depicted in FIG. 2, the force required to produce failure of at least one seal, averaged over numerous tests, is approximately 1200 pounds. Determined also was that this force correlated with a shear strain, or interblock dislocation, of 0.003 inches, causing the metal C-seal to fail in shear dislocation.

The present invention thus provides for significantly improved shear resistance by employing the bolt heads themselves as precision locating pins. A 3-block assembly as shown in FIG. 6 was tested for shear resistance. When tested for shear resistance employing the test method described previously, significant improvement was realized. For multiple assemblies and tests using commercial socket cap screws, the average force required to cause shear dislocation and seal failure increased to 3200 pounds. Using custom-made screws and counter-bores both having a tolerance of 0.0005 inches, the average force required to cause seal failure increased to 4800 pounds.

Transverse fluid communication between multiple linear modular assemblies (or "sticks"), is accomplished with transverse assemblies, or manifolds, as may be seen in FIG. 7. Consequently, there typically exist spans of assembled modular blocks that remain substantially unsupported from the mounting plate to which they are attached. Shock testing of these modular assemblies indicates that with 80G's shock input, a defacto semiconductor industry figure of merit, to an assembled modular gas system of this configuration, resonant shock transmission to the center of unsupported linear assemblies may well exceed 300 G's. The weight, with components attached, of typical unsupported spans can be five pounds, or more. Thus the instantaneous force on select inter-block seals may exceed 1500 pounds. The present invention, by improving the shear resistance of block-to-block seals from an average of 1200 pounds to 3200 pounds, provides both practical and cost-effective solution as well as commercial viability.

Referring to FIG. 2, a 3-block test assembly comprised of three modular blocks with C-sealed interfaces compressed to the manufacturer's specification, will repeatedly sustain a deformation in the center of the assembly of 0.015 inches without leaking, but will typically fail and leak with an inter-block shear dislocation on the order of 0.003 inches. In other words, a 0.003-inch slippage or dislocation of one modular block relative to an adjacently-sealed modular block will cause a leak failure when using C-seals. Because the C-seals 190, 590 themselves must be compressed to specific manufacturer's recommendations for maximum seal integrity, modular fluid-delivery blocks are machined with recesses, annularly-disposed to inter-connecting fluid ports, to accommodate the C-seals such that when the modular blocks are bolted or otherwise compressed face-to-face, the C-seals are optimally compressed and hermetic inter-block sealing is effected.

One aspect of the present invention is directed to a modular fluid block system (such as 100) including a first block (such as 160) having a first face (such as 162) and a second face (such as 163) and a pair of opposed fastener passages (such as 164). Each fastener passage has a first end opening to the first face and a second end opening to the second face. The first block further includes a pair of fastener receiving cavities (such as 166) in the first face and a fluid passage (such as 161) from the first face (such as 162) to the second face (such as 163). Each fastener passage includes a head receiving portion at the first end opening. The modular fluid block system also includes a second block having a third face and a fourth face and a pair of opposed fastener passages. Each fastener passage has a third end opening to the third face and a fourth end opening to the fourth face. The second block further includes a pair of fastener receiving cavities in the third face and a fluid passage from the third face to the fourth face and each fastener passage includes a head receiving portion at the third end opening. The first and second blocks are joined between the second and third faces by a fastener passing through the each of the fastener passages in the first block, and each fastener is removably secured in a corresponding fastener receiving cavity in the third face of the second block. Each fastener includes a head portion received into a corresponding head receiving portion when the fastener is secured into a corresponding fastener receiving cavity.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A modular fluid block system comprising:
   (a) a pair of fasteners, each having a fastener head;
   (b) a first block having a first face and an opposite second face, the first block defining:
      (i) a fluid passage extending through the block;
      (ii) a pair of fastener passages, each fastener passage having a first end opening at the first face and a second end opening at the second face, the first end opening having a fastener head receiving cavity for receiving the fastener head and the second end opening for receiving the fastener, the pair of fastener passages defining a first diagonal line;
      (iii) a pair of fastener receiving cavities in the first face defining a second diagonal line;
      (iv) a pair of fastener head receiving cavities in the second face positioned collinear with the fastener receiving cavities in the first face; and
   (c) a second block having a third face and an opposite fourth face, the second block defining:
      (i) a fluid passage extending through the second block;
      (ii) a pair of fastener passages, each fastener passage having a third end opening at the third face and a fourth end opening at the fourth face, the third end opening having a fastener head receiving cavity, the fastener head receiving cavities of the third face collinear with the fastener head receiving cavities of the second face, and the pair of fastener passages positioned collinear with the second diagonal line;
      (iii) a pair of fastener cavities in the third face collinear with the first fastener passages;
      (iv) a pair of fastener head receiving cavities in the fourth face positioned collinear with the first fastener receiving cavities;
      wherein the first and second blocks are joined between the second and third faces by the fasteners passing through each of the fastener passages in the first block and into the fastener cavities in the third face of the second block.

2. The system of claim 1, further including a third block, the third block having a fifth face and an opposite sixth face and:
   (a) a fluid passage extending through the block;
   (b) a fastener arrangement comprising a pair of fastener passages, each fastener passage having a fifth end opening at the fifth face and a sixth end opening at the sixth face, the fifth end opening having a fastener head receiving cavity for receiving a fastener head and the sixth end opening for receiving a fastener; and
   (c) a pair of fastener cavities in the fifth face.

3. The system of claim 2, wherein the fastener passages in the first block are collinear with the fastener passages in the third block.

4. The system of claim 2, wherein the pair of fastener receiving cavities in the first block collinear with the fastener cavities of the third block.

5. The system of claim 2, wherein the fluid passages in the third block extend from the extend from the fifth face to the sixth face and are collinear with the fluid passage of the first block and the second block.

6. The system of claim 1, wherein each of the fluid passages includes two fluid passage ends, each fluid passage end further including a seal-receiving portion having a diameter larger than a central portion of the fluid passage.

7. The system of claim 1, wherein the first diagonal line is perpendicular to the second diagonal line.

8. The system of claim 1, wherein the fluid passages in the first block extend from the first face to the second face and are collinear with the fluid passages in the second block, which extend from the third face to the fourth face.

* * * * *